(12) United States Patent
Yasukawa et al.

(10) Patent No.: US 9,998,712 B2
(45) Date of Patent: Jun. 12, 2018

(54) MONITORING APPARATUS

(71) Applicant: NK WORKS CO., LTD., Wakayama-shi, Wakayama (JP)

(72) Inventors: Toru Yasukawa, Wakayama (JP); Shoichi Dedachi, Wakayama (JP); Masayoshi Uetsuji, Wakayama (JP); Takeshi Murai, Wakayama (JP); Shuichi Matsumoto, Wakayama (JP)

(73) Assignee: NORITSU PRECISION CO., LTD., Wakayama-shi (JP)

( * ) Notice: Subject to any disclaimer, the term of this patent is extended or adjusted under 35 U.S.C. 154(b) by 138 days.

(21) Appl. No.: 14/213,143

(22) Filed: Mar. 14, 2014

(65) Prior Publication Data
US 2014/0267663 A1    Sep. 18, 2014

(30) Foreign Application Priority Data

Mar. 15, 2013   (JP) ................. 2013-054425

(51) Int. Cl.
| | |
|---|---|
| *H04N 7/18* | (2006.01) |
| *G08B 21/04* | (2006.01) |
| *G08B 21/22* | (2006.01) |
| *G06K 9/00* | (2006.01) |

(52) U.S. Cl.
CPC ........... *H04N 7/18* (2013.01); *G06K 9/00369* (2013.01); *G06K 9/00771* (2013.01); *G08B 21/043* (2013.01); *G08B 21/0423* (2013.01); *G08B 21/0476* (2013.01); *G08B 21/22* (2013.01)

(58) Field of Classification Search
CPC ........................................ H04N 7/18
USPC ............................................. 382/118; 348/77
See application file for complete search history.

(56) References Cited

U.S. PATENT DOCUMENTS

| | | | | | |
|---|---|---|---|---|---|
| 5,850,352 | A | * | 12/1998 | Moezzi ................ | H04N 5/222 345/419 |
| 2007/0183567 | A1 | * | 8/2007 | Rotondo ................ | A61B 6/08 378/38 |
| 2008/0037837 | A1 | * | 2/2008 | Noguchi ............ | G06K 9/00335 382/118 |
| 2013/0222583 | A1 | * | 8/2013 | Earnshaw ................ | H04N 7/18 348/143 |

FOREIGN PATENT DOCUMENTS

| | | | |
|---|---|---|---|
| JP | 2011-5171 A | | 1/2011 |
| JP | 2011005171 A | * | 1/2011 |

* cited by examiner

*Primary Examiner* — Jonathan Messmore
(74) *Attorney, Agent, or Firm* — Westerman, Hattori, Daniels & Adrian, LLP

(57) ABSTRACT

Provided is a monitoring apparatus in which the installation position of an imaging unit is not restricted, settings can be easily changed, and it is possible to accurately analyze behavior of a monitoring target.
The present invention is a monitoring apparatus for monitoring behavior of a monitoring target, and includes an imaging unit; a display unit that displays the monitoring target imaged by the imaging unit in real time and displays a marker for specifying the position of the monitoring target; a first input unit that receives input of an installation position of the imaging unit relative to the monitoring target; a first storage unit storing monitoring environment data that defines, in advance, an environment around the monitoring target that is to be imaged by the imaging unit, in accordance with the installation position.

9 Claims, 12 Drawing Sheets

MONITORING APPARATUS

TECHNICAL FIELD

The present invention relates to a monitoring apparatus.

BACKGROUND ART

In recent years, accidents in which hospitalized patients, institutionalized patients, patients in need of nursing care, or the like roll or fall out of bed, and accidents caused by the wandering of patients with dementia have tended to increase year after year. As a method for preventing these kinds of accidents, for example, monitoring systems that use tools such as load sensors, body motion wires, and infrared sensors to detect the actions of a person being watched, such as sitting up, edge-sitting, and leaving bed, have been introduced in hospitals. For example, Patent Literature 1 discloses that a watching region for determining that a patient lying in a bed has performed a getting-up behavior is set in a region directly above the bed including the patient sleeping in the bed. Then, it obtains a variance value that indicates the size of an image region thought to be the patient occupying a watching region in a captured image that includes the watching region as viewed from beside the bed, and if the variance value is less than an initial value indicating the size of the image region thought to be the patient occupying the watching region in the captured image that is obtained from the camera during a state in which the patient is lying in the bed, it is determined that the patient has performed a getting-up behavior.

CITATION LIST

Patent Literature

Patent Literature 1: JP 2011-005171A

SUMMARY OF INVENTION

Technical Problem

However, with the technique disclosed in Patent Literature 1, the position of the imaging unit that includes the camera is fixed, and therefore cannot be changed easily. This is because the position of the camera is in correspondence with the watching region in the captured image, and therefore, if the position of the camera is changed, the setting of the watching region also needs to be changed. Accordingly, in order to watch a patient using the conventional technique, the camera needs to be fixed, and if the position of the camera needs to be changed due to the type of the room or the bed, watching cannot be performed using the camera in the first place. Alternatively, if the position of the camera is changed, there is a problem in that the setting of the watching region and the like needs to be changed accordingly, and the setting of the system requires a large amount of work. Note that this kind of problem can occur not only in the field of nursing care, but also in the case where the actions of a specific monitoring target are to be monitored.

The present invention was made in order to solve the problems above, and it is an object of the present invention to provide a monitoring apparatus in which the installation position of an imaging unit is not restricted, setting change can be easily performed, and the behavior of a monitoring target can be analyzed accurately.

Solution to Problem

The present invention is a monitoring apparatus that monitors behavior of a monitoring target, and includes an imaging unit; a display unit that displays the monitoring target imaged by the imaging unit in real time and displays a marker for specifying the position of the monitoring target or a monitoring target reference object; a first input unit that receives input of an installation position for the imaging unit relative to the monitoring target or the monitoring target reference object; a first storage unit storing monitoring environment data that defines, in advance, an environment around the monitoring target that is to be imaged by the imaging unit, in accordance with the installation position; a first setting control unit that reads out the monitoring environment data from the first storage unit based on the installation position input to the first input unit and sets a monitoring environment condition; a second input unit that receives input of completion of alignment after the monitoring target or the monitoring target reference object and the marker displayed on the display unit are aligned by changing at least one of the position and the orientation of the imaging unit at the installation position; a second storage unit that, after the alignment is complete, stores the position of the marker as the monitoring reference position of the monitoring target or the monitoring target reference object; a second setting control unit that, based on the monitoring environment condition and the monitoring reference position that was input to the second input unit, sets a monitoring reference condition that is to be a reference for analyzing behavior of the monitoring target based on an image of the monitoring target imaged by the imaging unit; and an image analysis unit that, based on the monitoring reference condition, analyzes the image of the monitoring target imaged by the imaging unit and detects behavior of the monitoring target. Note that a structure such as a piece of furniture in the periphery of the monitoring target can be used as the monitoring target reference object for example.

According to this configuration, effects such as the following can be obtained. First, when the image of the monitoring target imaged by the imaging unit is to be analyzed, a reference position and the like for the monitoring target need to be specified, and the behavior of the monitoring target is analyzed by comparing the reference position and the image of the monitoring target. At this time, a problem arises in that the monitoring target displayed on the display unit is displayed differently depending on the position of the apparatus. For example, in the case of imaging the monitoring target from the front and in the case of imaging from the side, sometimes the shape, orientation, and size of the monitoring target displayed on the display unit varies, although it is the same monitoring target. Accordingly, if the installation position of the imaging unit changes, there is a possibility that the behavior of the monitoring target cannot be analyzed accurately since the shape and the like of the captured image of the monitoring target is different, even though it is the same behavior. For this reason, the position and the orientation of the imaging unit need to be fixed in the conventional technology.

In view of this, with the present invention, monitoring environment data that pre-defines the environment around the imaged monitoring target is stored according to the installation position of the imaging unit. The monitoring environment data enables performing image analysis corresponding to the installation position of the imaging unit. That is to say that the image captured by the imaging unit varies depending on the installation position of the imaging unit, and therefore, if the monitoring environment data is referenced, the environment around the monitoring target is set as the monitoring environment condition for each installation position of the imaging unit, and therefore the behavior of the monitoring target can be accurately analyzed using the environment as a reference. Furthermore, the monitoring target or the monitoring target reference object is aligned with the marker displayed on the display unit and the aligned position of the marker is stored as the monitoring reference position, and therefore the position of the monitoring target or the monitoring target reference object in the captured image can be accurately specified. If the monitoring reference condition that is to be a reference for analyzing the behavior of the monitoring target based on the image of the monitoring target imaged by the imaging unit is generated based on the monitoring environment data and the monitoring reference position that were set in this way, the environment around the monitoring target corresponding to the installation position, or in other words, the reference for the behavior can be provided, and therefore the image of the monitoring target imaged by the imaging unit can be accurately analyzed.

The above-described monitoring apparatuses can further include a support unit that supports the imaging unit. The imaging unit can be configured such that at least one of the position and the orientation with respect to the support unit is adjustable. According to this kind of configuration, the installation position of the above-described imaging unit is determined by first determining the position of the support unit. Thereafter, the marker can be aligned by adjusting the angle of the imaging unit with respect to the support unit and the position in the up-down direction or the like.

The above-described alignment of the marker can be performed manually in the above-described monitoring apparatus, and it can be performed mechanically. For example, a third input unit that receives input of the position of the monitoring target or the monitoring target reference object displayed on the display unit, and a drive unit that changes at least one of the position and the orientation of the imaging unit with respect to the support unit can be further included, and the second setting control unit can be configured to perform control of the drive unit such that the marker is aligned to the position of the monitoring target or the monitoring target reference object on the display unit received by the third input unit. According to this, the alignment between the marker and the monitoring target can be performed automatically. The drive unit can adjust the angle and the position of the imaging unit by combining mechanical mechanisms, a motor, and the like, for example.

In the above-described monitoring apparatuses, the display unit can display a plurality of installation position candidates indicating candidates for the installation position and perform a display that prompts input of one of the plurality of installation position candidates from the first input unit. This simplifies the input of the installation position.

In the above-described monitoring apparatuses, the marker can be configured to have the shape of a person or the shape of a monitoring target reference object, and a configuration is possible in which at least one of the orientation and the shape of the marker displayed on the display unit is different according to the installation position. This simplifies the alignment between the monitoring target and the marker displayed on the display unit.

In the above-described monitoring apparatuses, the monitoring environment data can have at least a mode of the monitoring target reference object that is arranged in the periphery of the monitoring target and is included in the image captured by the imaging unit. The mode of the monitoring target reference object can be the size, shape, orientation, and the like of a reference object included in the captured image.

The above-described monitoring apparatuses can further include a notification unit that performs notification of the behavior of the monitoring target detected by the image analysis unit. By doing so, the behavior of the monitoring target can be known easily.

Advantageous Effects of Invention

According to the present invention, it is possible to accurately analyze the behavior of a monitoring target.

REFERENCE SIGNS LIST

Figure 1:
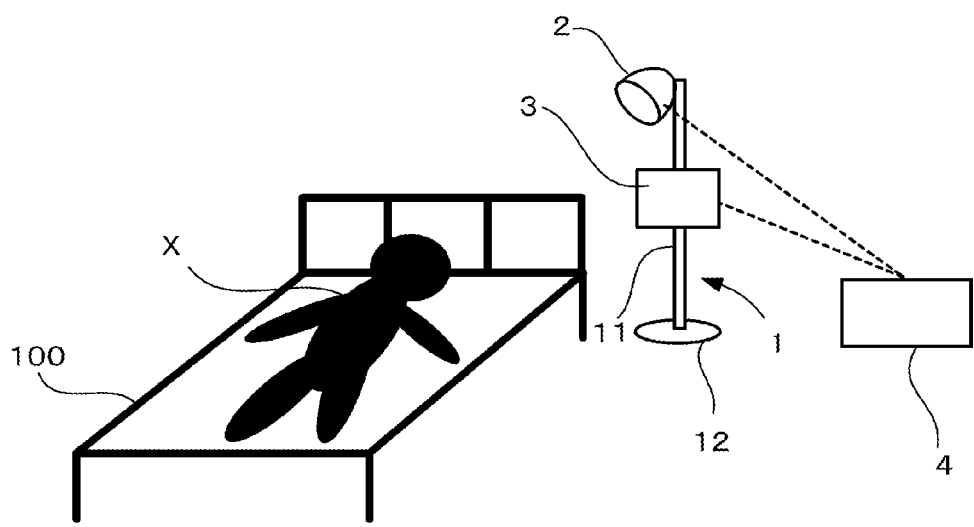
FIG. 1 is a schematic diagram of a monitoring apparatus according to a first embodiment of the present invention.

1 Support unit
2 Camera (imaging unit)
3 Liquid crystal display (display unit, first to third input units)
42 Storage unit
72 First setting control unit
73 Second setting control unit

DESCRIPTION OF EMBODIMENTS

1. First Embodiment

Hereinafter, a first embodiment in which a monitoring apparatus according to the present invention is applied to a situation where the actions of a hospitalized patient (monitoring target) in a hospital are watched will be described with reference to the drawings.

1-1. Overview of Monitoring Apparatus

In order to watch the actions of a hospitalized patient, a monitoring apparatus according to the present embodiment is arranged in the proximity of a bed 100 for a hospitalized patient X in a hospital room. Specifically, the monitoring apparatus includes a support unit 1 that extends upward from the floor surface, and a camera (imaging unit) 2 and a liquid crystal display (display unit) 3 are supported by the support unit 1. Also, the monitoring apparatus is provided with an information processing apparatus 4 that controls the operation of the camera 2 and the liquid crystal display 3.

The support unit 1 includes a rod-shaped member 11 that extends in the up-down direction, and a base 12 that is attached to the lower end of the rod-shaped member 11. The base 12 is placed on the floor and supports the rod-shaped member 11. The rod-shaped member 11 is configured to be extendable, and the above-described camera 2 is attached to the upper end thereof. Also, the angle of the camera 2 is adjustable with respect to the rod-shaped member 11. Accordingly, due to the rod-shaped member 11 extending, the position of the camera 2 can be changed in the up-down direction, and the angle can also be adjusted as well. For this reason, the camera 2 can easily be aligned with respect to the hospitalized patient X in the bed 100.

The liquid crystal display 3 can be a touch panel type of display, displays images captured by the camera 2 in real time, and is operated by an operator (typically a health care provider). Also, the liquid crystal display 3 is detachably attached to the central portion of the rod-shaped member 11 and can be removed from rod-shaped member 11 and used at the time of operation. The camera 2 and the liquid crystal display 3 are wirelessly connected to the information processing apparatus 4 and can be connected using near field communication according to a Bluetooth (registered trademark) method, a UWB (Ultra Wide Band) method, or a wireless LAN (Local Area Network), for example. Note that they can also be connected by a wire such as a cable.

1-2. Hardware Configuration of Information Processing Apparatus

Figure 2:
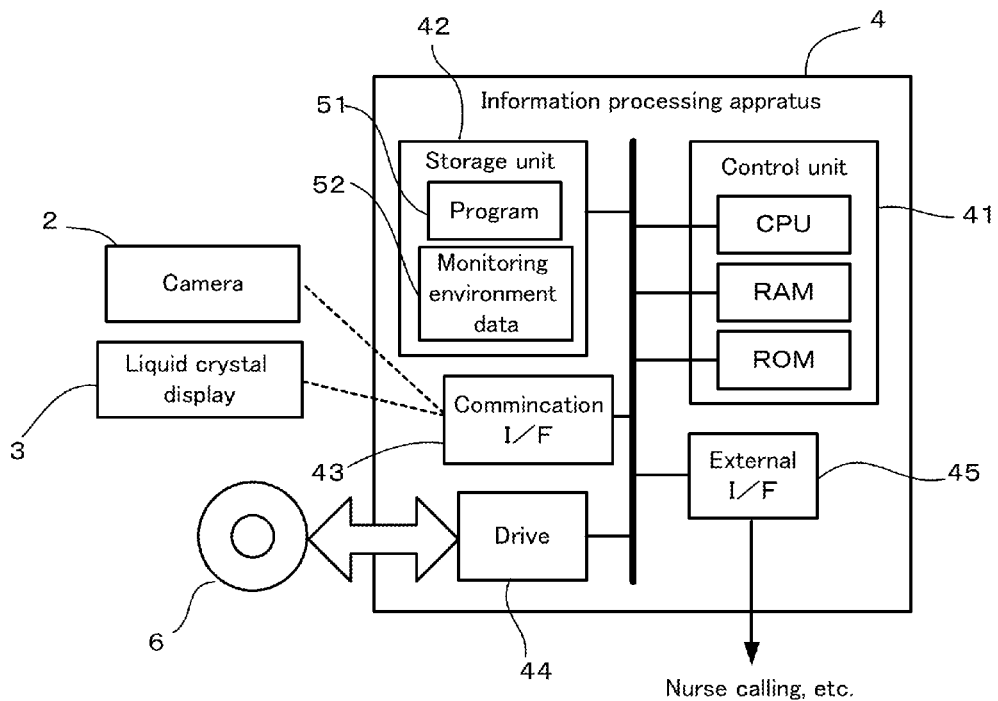
FIG. 2 is a block diagram showing a hardware configuration of an information processing apparatus in FIG. 1.

The information processing apparatus 4 will be described next. First, the hardware configuration of the information processing apparatus 4 will be described with reference to FIG. 2. FIG. 2 illustrates the hardware configuration of the information processing apparatus 4 according to the present embodiment. As shown in this figure, the information processing apparatus 4 is a computer in which a control unit 41 including a CPU, a RAM (Random Access Memory), a ROM (Read Only Memory), and the like, a storage unit 42 storing a program that is executed by the control unit 41, monitoring environment data 52 for monitoring, and the like, a communication interface 43 for performing communication via a network, a drive 44 for loading a program stored in a storage medium 6, and an external interface 45 for connecting to an external apparatus are electrically connected. Alternatively, a general-use apparatus such as a PC (Personal Computer) or a tablet terminal for example may be used as the information processing apparatus 4, instead of an apparatus designed especially for the provided service. Also, the information processing apparatus 4 may be implemented by one or more computers.

Note that regarding the specific hardware configuration of the information processing apparatus 4, it is possible to omit, replace, or add constituent elements as appropriate in accordance with the embodiment. For example, the control unit 41 may include multiple processors. Also, the information processing apparatus 4 may include an output apparatus such as a display, and an input apparatus for performing input, such as a mouse and a keyboard. Note that in FIG. 2, the communication interface and the external interface are denoted as "communication I/F" and "external I/F" respectively.

Also, the information processing apparatus 4 may include multiple external interfaces 45 and connect to multiple external apparatuses. The information processing apparatus 4 in the present embodiment is wirelessly connected to the above-described camera 2 and the liquid crystal display 3 via the communication interface 43. Also, it is possible to connect to a piece of equipment provided by an institution, such as a nurse calling button via the external interface 45. This enables the piece of equipment to also be used for performing notification of a prediction that the hospitalized patient will be in danger. Note that if the camera 2 and the liquid crystal display 3 are connected using a wire, they are connected to the external interface 45.

The program 51 executed by the control unit 41 is a program for causing the information processing apparatus 4 to execute steps included in a later-described operation, and the program 51 may be stored in the storage medium 6 rather than in the storage unit 42. The storage medium 6 is a medium that electrically, magnetically, optically, mechanically, or chemically accumulates information such as a program such that the recorded information such as the program can be read by a computer, another apparatus, a machine, or the like. In FIG. 2, a disk type of storage medium such as a CD (Compact Disk) or a DVD (Digital Versatile Disk) is illustrated as an example of the storage medium 6, but the type of the storage medium 6 is not limited to being a disk type and may be a type other than a disk type. A semiconductor memory such as a flash memory can be used as a storage medium that is not a disk type, for example.

1-3. Functional Configuration of Information Processing Apparatus

Figure 3:
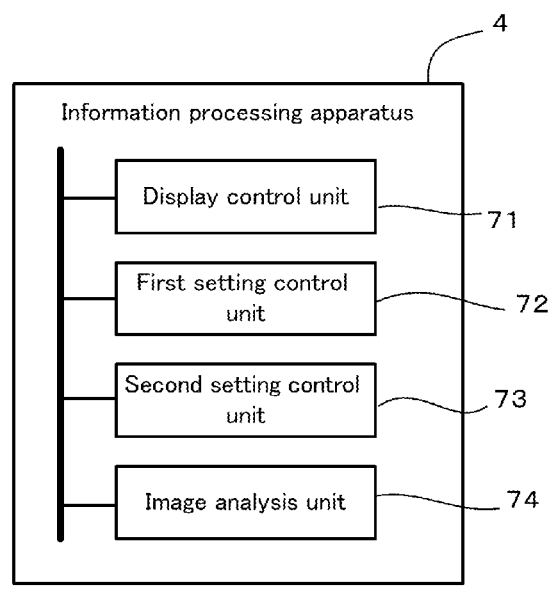
FIG. 3 is a block diagram showing a functional configuration of the information processing apparatus in FIG. 1.

FIG. 3 shows an example of the functional configuration of the information processing apparatus 4 according to the present embodiment. The CPU included in the information processing apparatus 4 according to the present embodiment deploys the program 51 that is stored in the storage unit 42 to the RAM. Then, the program 51 deployed to the RAM is interpreted and executed by the CPU, and thereby the CPU performs control of the constituent elements. According to this, the information processing apparatus 4 according to the present embodiment functions as a computer that includes a display control unit 71, a first setting control unit 72, a second setting control unit 73, and an image analysis unit 74. These units will be described below.

The display control unit 71 performs control of the operation screen displayed on the liquid crystal display 3. For example, it performs operation screen display control, control for receiving images captured by the camera 2 and causing the liquid crystal display 3 to display the images in real time, and control of the various display states displayed on the liquid crystal display 3, such as the display setting of the liquid crystal display 3. Here, an example of an operation screen 30 that is displayed on the liquid crystal display 3 will be described with reference to FIG. 4. As shown in this figure, an installation position setting region 31 for setting the installation position of the monitoring apparatus is provided on the left side of the operation screen 30, and an image display region 32 for displaying images captured by the camera 2 in real time is provided on the right side. Also, a confirm button 33 for confirming the position of the hospitalized patient as will be described later is provided in the lower right portion of the operation screen 30, and a cancel button 34 for canceling the operation of the confirm button 33 is provided in the lower left portion of the operation screen 30. As described above, a touch panel is provided on the liquid crystal display 3, and therefore an input operation such as pressing the button 33 or 34 can be performed by touching the liquid crystal display 3.

A display 311 for prompting the input of the installation position, stating "(1) Touch the camera position" is included in the upper portion of the installation position setting region 31 provided on the operation screen 30. Also, below this display, a rectangular bed 310 for the hospitalized patient to sleep in is displayed such that the head of a hospitalized patient 313 is at the top, and candidates (circular displays) for the camera installation positions 312*a* to 312*h* are displayed in eight locations around the bed. To give a more detailed description, the camera installation position candidates 312*a* to 312*h* are provided in the proximity of the four corner portions of the bed 310 and in the proximity of the center of the upper, lower, left, and right sides of the bed 310, and the installation position of the camera 2 is input by touching any of the candidates. Note that in the example in FIG. 4, the color of the upper-right installation position 312*c* is different, and this indicates that the upper-right installation position 312*c* has been selected.

When the installation position of the camera 2 is input, the first setting control unit 72 sets a monitoring environment condition for image analysis. For example, regarding the image captured by the camera 2, the shapes, orientations, and sizes of the patient and a peripheral structure displayed on the liquid crystal display 3 are different in the case where the hospitalized patient is photographed from above and in the case where the hospitalized patient is photographed from the side, although it is the same hospitalized patient. In other words, depending on the position of the camera 2, the image of the patient that is to be the basis for performing image analysis, and the images of structures and the like around the patient are different. In view of this, in the present embodiment, the position of the camera 2 is input, and the monitoring environment condition that is to be the basis for image analysis is set as described above.

Figure 4:
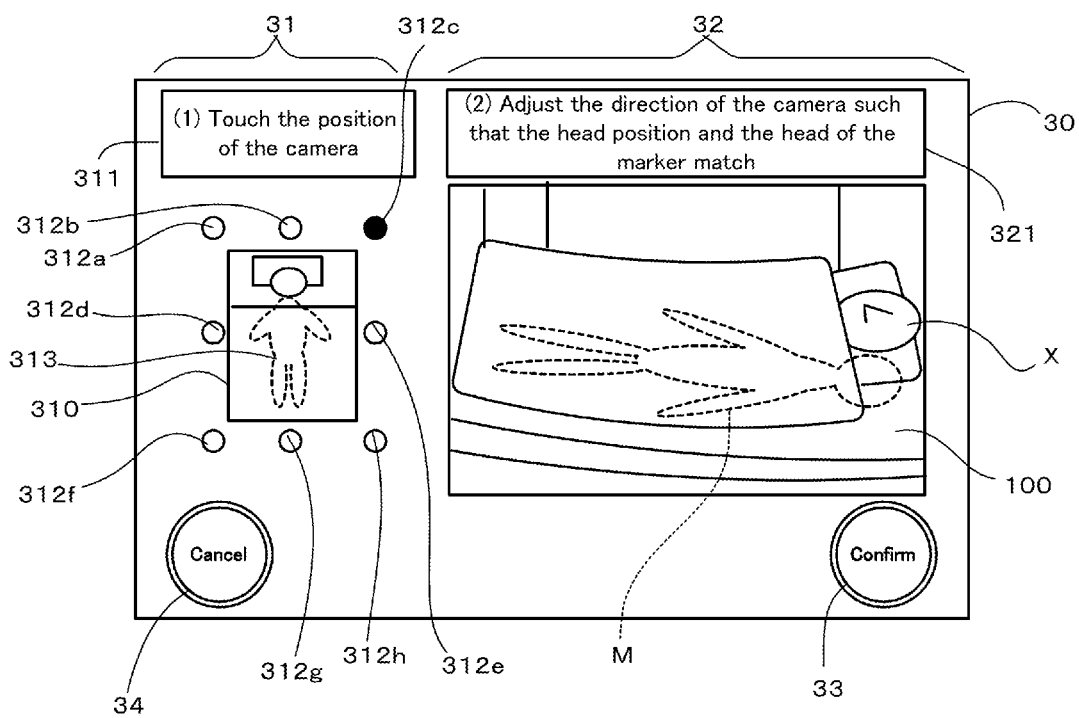
FIG. 4 is a diagram showing an example of an operation screen on a liquid crystal display.
Figure 5:
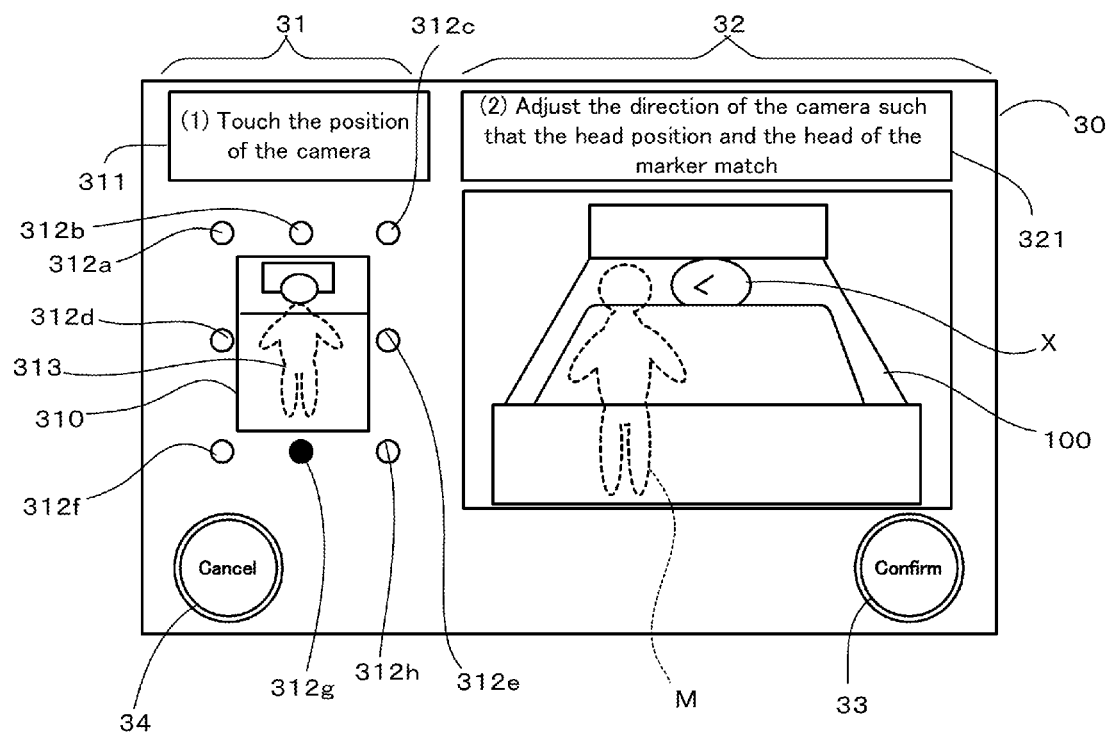
FIG. 5 is a diagram showing an example of an operation screen on a liquid crystal display.
Figure 6:
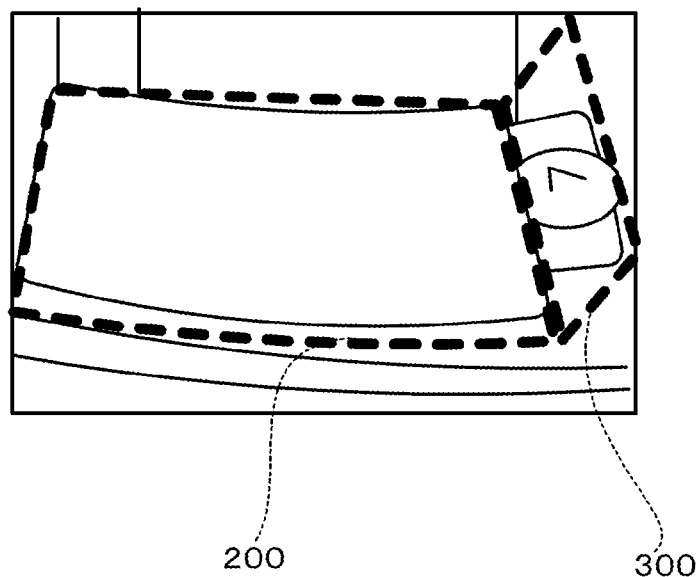
FIG. 6 is a diagram showing an environment region and a moving body region in a captured image.
Figure 7:
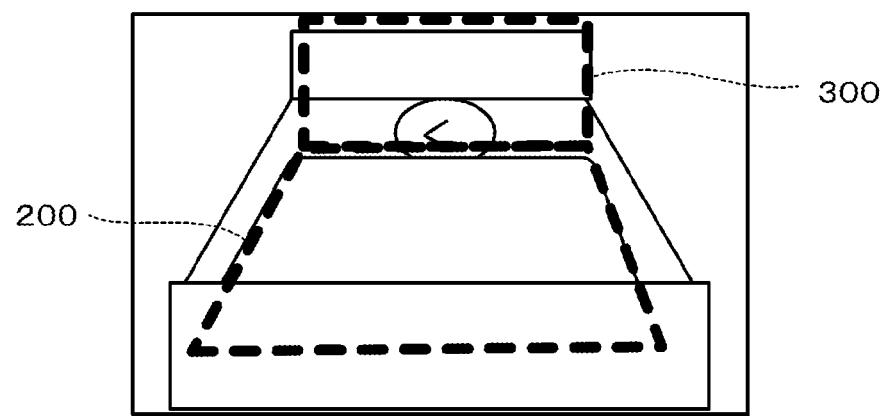
FIG. 7 is a diagram showing an environment region and a moving body region in a captured image.

To give a more detailed description, the image display region 32 of the operation screen in FIG. 4 indicates an image in the case where the camera 2 is arranged at a location that is obliquely above the bed, and for example, if the camera 2 is arranged at the foot end of the bed 100 (installation position 312*g*) as shown in FIG. 5, the image displayed in the image display region 32 will be completely different. In other words, the orientations, shapes, and sizes of the hospitalized patient X and the bed 100 are different in the image shown in FIG. 4 and the image shown in FIG. 5. Accordingly, in order to analyze the behavior of the hospitalized patient using the image, it is necessary to specify at least the environment around the hospitalized patient X including the bed 100. For this reason, monitoring environment data that is set for each installation position of the camera 2 is stored in the storage unit 42 in the present embodiment. Monitoring environment data pre-defines the peripheral environment around the hospitalized patient X, and for example, it defines the position, size, and shape of the bed 100 and a region in which the hospitalized patient X can move in the captured image. For example, FIG. 6 shows monitoring environment data for the example shown in FIG. 4. That is to say, there is an environment region 200 indicating the bed and a moving body region 300 in which the patient can move in the image captured at the corresponding installation position, and the coordinates and the like of these images are the monitoring environment data. Similarly, the monitoring environment data in the example shown in FIG. 5 is shown in FIG. 7 as the environment region 200 indicating the bed, and the moving body region 300 in which the patient can move. In this way, the image that is to be the environment around the hospitalized patient X that is the basis for monitoring is completely different depending on the position of the camera 2, and therefore in the present embodiment, when the position of the camera 2 is input, the first setting control unit 72 reads out the monitoring environment data that corresponds to the input position of the camera 2 from the storage unit 42 and sets the data as the monitoring environment condition. This monitoring environment data is determined in advance based on the size, shape, and the like of the bed at each position at which the camera 2 is arranged.

As described above, when the position of the camera 2 is input, the first setting control unit 72 displays a marker M in the image display region 32 as shown in FIG. 4. The marker M has the shape of a person (outline indicated by a dashed line) and is set as one piece of monitoring environment data for each installation position of the camera 2. That is to say, the shape of the person indicated by the marker M varies depending on the position of the camera 2. For example, in the image display region 32 in FIG. 4, a marker M is displayed that has the shape of a person that is suitable for the displayed bed 100. Note that the second setting control unit 73 may display the marker M.

In the example shown in FIG. 4, the position of the marker M and the position of the hospitalized patient displayed in the image display region 32 are different. For this reason, the operator moves the camera 2, thereby matching the position of the marker M and the position of the hospitalized patient X. Regarding this point, the operator is prompted to perform adjustment by the display saying "(2) Adjust the direction of the camera such that the head position matches the head of the marker" in the upper portion of the image display region 32. As described above, the angle and height of the camera 2 can be changed with respect to the rod-shaped member 11, and therefore the operator matches the positions of the two heads while viewing the image display region 32. Then, when the alignment is complete, the operator presses the confirm button 33. Thus, when the confirm button 33 is pressed, the second setting control unit 73 sets the position of the marker M in the image as the monitoring reference position. That is to say, the position of the hospitalized patient X in the image (coordinates and the like in the image) is determined.

Next, the second setting control unit 73 sets the monitoring reference condition based on the monitoring environment condition that was read out as described above and the set monitoring reference position. The above monitoring environment condition is the mode of the bed 100 or the like that is determined based on the position of the camera 2, but since accurate positions have not been set, the position of the bed 100 in the image is specified by aligning the marker M as described above. The monitoring reference condition is set based on this. That is to say, the monitoring reference condition is obtained by correcting the monitoring environment condition that was set first, or in other words, the position of the bed (monitoring target reference object) arranged around the patient X in the captured image, based on the monitoring reference position that was set using the marker M, and an accurate position of the bed 100 in the image is specified according to the condition.

Thus, when the monitoring reference condition is set by the second setting control unit 73, preparations for monitoring the hospitalized patient X are complete. The image analysis unit 74 analyzes the behavior of the hospitalized patient X. The image analysis unit 74 can have a variety of configurations, and an example of image analysis performed by the image analysis unit 74 will be described below.

1-4. Example of Image Analysis

Figure 8:
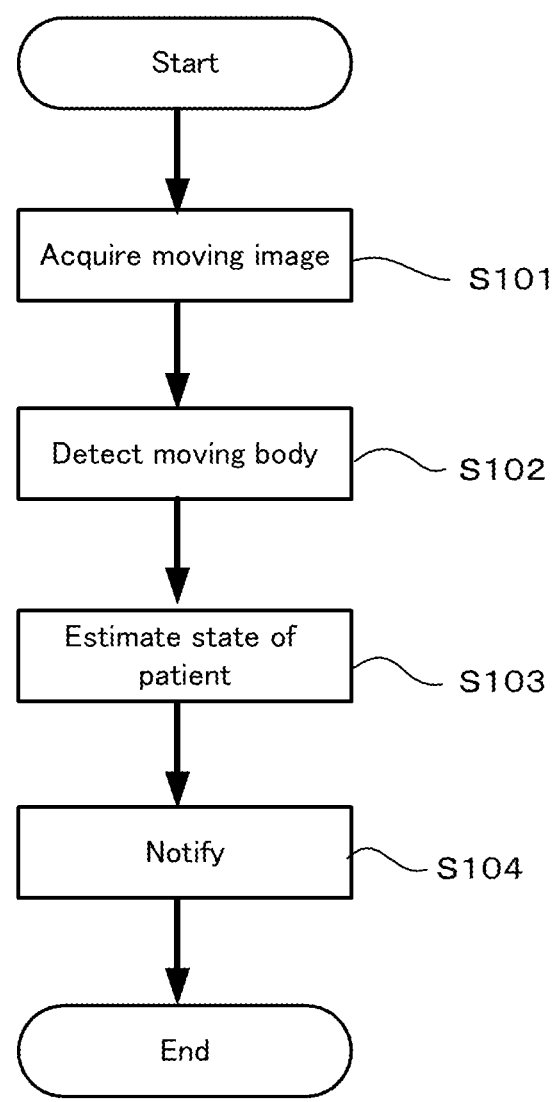
FIG. 8 is a flowchart showing a procedure of image analysis performed by an image analysis unit.

FIG. 8 is a flowchart showing an example of operations of the information processing apparatus 4 according to the present embodiment. Note that the procedure of processing for the exemplary operations described below is merely an example, and the processes may be replaced wherever possible. Also, it is possible to omit, replace, or add processing in the procedure of processing for the exemplary operations described below as necessary depending on the mode of implementation.

In step S101, the image analysis unit 74 acquires a moving image of the patient X and the monitoring target reference object that is to be the reference for the actions of the patient (here, the bed 100). In the present embodiment, the image analysis unit 74 acquires the moving image of the hospitalized patient X and the bed 100 from the camera 2.

In this case, the image analysis unit 74 may acquire images in synchronization with a video signal for the camera 2. Then, the image analysis unit 74 may immediately execute the processing of later-described steps S102 to S103 on the acquired images. By continuously executing the operations without pause, the information processing apparatus 4 makes it possible to realize real-time image processing and to watch the actions of a hospitalized patient or an institutionalized patient in real time.

In step S102, the image analysis unit 74 detects the above-described moving body region 300 in which movement occurs, or in other words, a region in which a moving body is present in the moving image acquired in step S101. A method of using a difference image and a method of using an optical flow are examples of possible methods for detecting the moving body.

The method of using the difference image is a method in which the moving body is detected by observing the difference between multiple images captured at different times. Specific examples of this method include a background subtraction method in which the moving body region 300 is detected based on the difference between a background image and an input image, an intra-frame subtraction method in which the moving body region 300 is detected using three different images, and a statistical background subtraction method in which the moving body region 300 is detected with the application of a statistical model.

Also, the method of using an optical flow is a method in which the moving body is detected based on an optical flow that expresses the movement of an object in vectors. Specifically, an optical flow expresses the movement amount of the same associated target in two images captured at different times as vector data. Examples of methods for obtaining the optical flow include a block matching method of using template matching to obtain an optical flow, and a gradient method of using the constraints of time-space differentiation to obtain an optical flow. Since the optical flow expresses the movement amount of the object, with these methods, the moving body region can be detected by obtaining pixels whose vector values in the optical flow are not zero.

The image analysis unit 74 may select any of these methods to detect the moving body. Also, any of the above methods may be selected by a user as the method for detecting the moving body. The method for detecting the moving body is not limited to any of the above methods and may be selected as appropriate depending on the mode of implementation.

In step S103, the image analysis unit 74 estimates the action of the patient X with regard to the bed 100, in accordance with the positional relationship between the environment region 200 set in the moving image as the region in which the bed 100 is present and the moving body region 300 detected in step S102. In the present embodiment, the image analysis unit 74 estimates at least one of the following actions as the action of the patient X with regard to the bed 100: sitting up in the bed 100, sitting on the edge of the bed 100, going over the barriers of the bed 100, falling from the bed 100, and leaving the bed 100. Sitting up in the bed 100 will be described below. Note that in the present embodiment, the bed 100 has been selected as the monitoring target reference object that is to be the reference for the action of the patient, and therefore the environment region 200 may be referred to as the bed region, the bed area, or the like.

Figure 9:
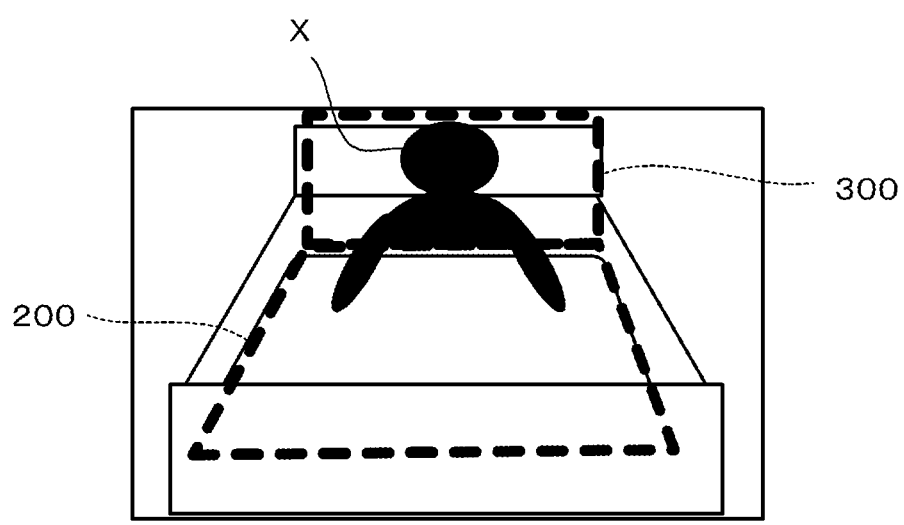
FIG. 9 is an image showing a patient sitting up.

It is presumed that the patient X has sat up as illustrated in FIG. 9 from the state illustrated in FIG. 7, or in other words, from the state of sleeping face up in the bed 100 (supine position). In this state, in step S101, the image analysis unit 74 of the information processing apparatus 4 can acquire a moving image such as that illustrated in FIG. 9 from the camera 2 at the foot end of the bed 100.

At this time, the upper body of the patient X rises up from the supine position state, and therefore, in the moving image acquired in step S101, it is envisioned that movement occurs in the region above the bed 100, which is the region where the patient's upper body appears. That is to say, it is envisioned that the moving body region 300 is detected in step S102 at a position proximal to that illustrated in FIG. 9.

Here, it is assumed that the environment region 200 is set in the moving image so as to include the region where the bed 100 appears, as illustrated in FIG. 9. Thereafter, when the patient X sits up in the bed 100, it is envisioned that the moving body is detected in step S102 in the moving body region 300 in the periphery of the upper edge of the environment region 200.

In view of this, in step S103, if the moving body is detected in the moving body region 300 using the positional relationship with the environment region 200 that is illustrated in FIG. 9, or in other words, if the moving body is detected in the moving body region 300 in the periphery of the upper edge of the environment region 200, the image analysis unit 74 estimates that the patient X has sat up in the bed 100. Thus, when the sitting-up is estimated, notification of this fact is performed as needed (step S104). In other words, the patient's sitting-up is notified using a piece of equipment such as the nurse calling button.

Note that in FIG. 9, the shape of the moving body region 300 in which movement occurs is illustrated as rectangle. However, the illustration does not indicate that the moving body region needs to be rectangular. Similarly to the detection of the sitting-up behavior as described above, sitting on the edge of the bed, going over the barriers of the bed, falling out of the bed, and leaving the bed can be detected by similarly setting the environment region 200 and the moving body region 300 according to the behavior.

Note that the description above is an example, and it is sufficient that at least the position of the bed 100 is specified as the environment region 200 in the image. Also, it is sufficient that the moving body region 300 is determined according to the behavior of the patient that is to be detected. For example, the moving body region 300 above was obtained by envisioning sitting up, but edge-sitting can be detected if the moving body region is set to the side portion of the bed. Also, it is also possible to detect the above-described edge-sitting, going over the barriers of the bed, falling out of the bed, and leaving the bed, based on the positional relationship between the detected moving body and the bed 100 without setting any moving body region in particular.

1-5. Monitoring Procedure

Figure 10:
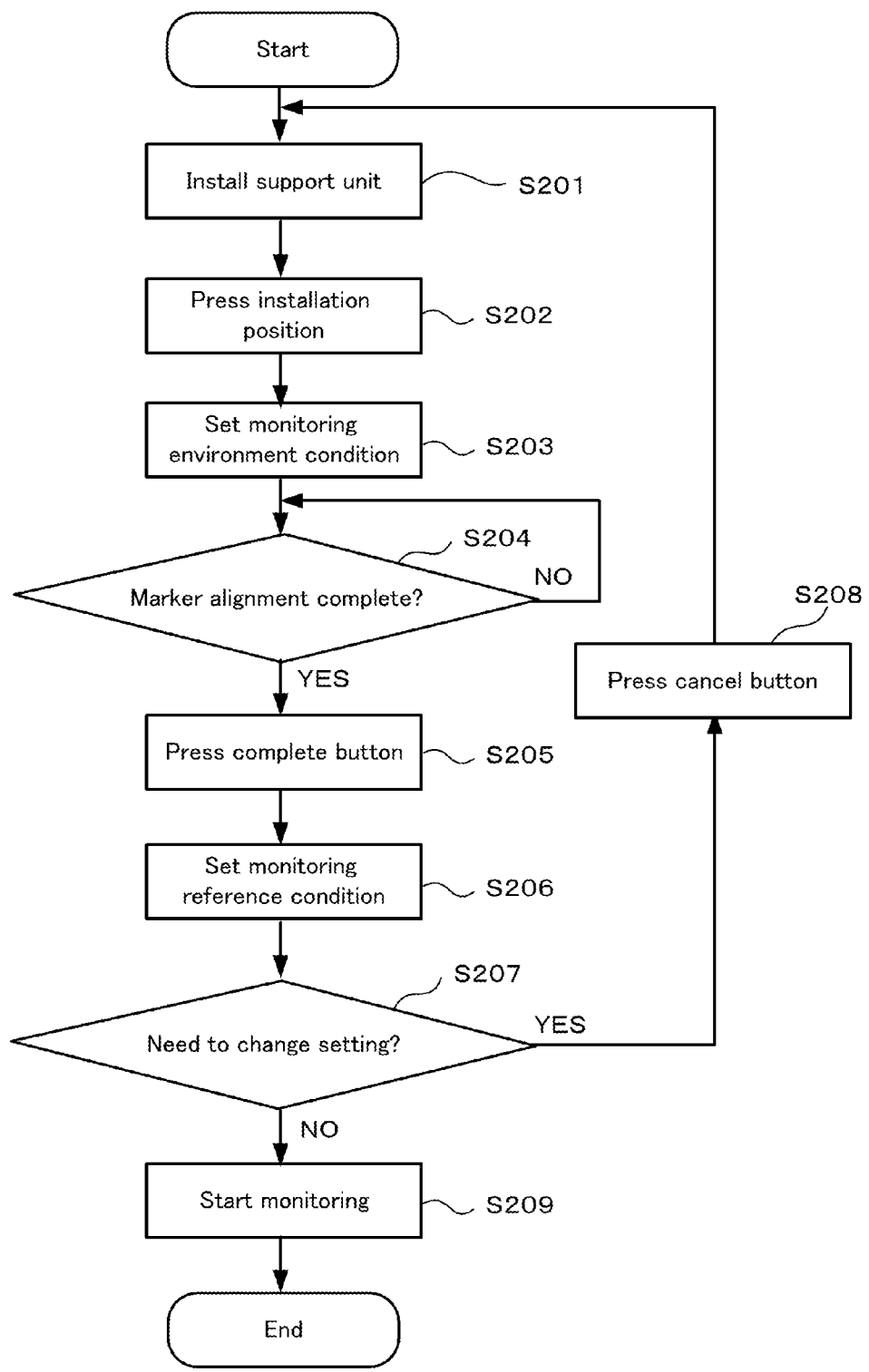
FIG. 10 is a flowchart showing a monitoring procedure of the monitoring apparatus according to the first embodiment.

Next, a procedure of monitoring using the monitoring apparatus configured as described above will be described with reference to the flowchart shown in FIG. 10. After first checking that the patient X is in the bed 100, the power of the monitoring apparatus including the information processing apparatus 4 is switched on. According to this, an operation screen such as that shown in FIG. 4 is displayed on the liquid crystal display 3. Next, the support unit 1 of the monitoring apparatus is arranged at any of the positions around the bed 100 of the hospitalized patient (step S201). Here, similarly to FIG. 4, it is arranged at the right corner of the head end of the bed 100. In this state, from among the camera position candidates displayed in the installation position setting region 31 on the operation screen, the position at which the support unit 1 is installed is pressed (step S202). Accordingly, the first setting control unit 72 reads out the environment reference data corresponding to the input position of camera 2 from the storage unit 42 and sets the data as the environment reference condition (step S203). At the same time, as shown in FIG. 4, the marker M corresponding to the position of the camera 2 is displayed in the image display region 32.

Next, the operator aligns the marker M and the patient X displayed in the image display region 32. Specifically, as in the above description for the image display region 32, the head portion of the marker M, which has the shape of a person, is positioned on the head of the patient X. In order to do this, the operator performs alignment by adjusting the angle of the camera 2 or extending/retracting the rod-shaped member 11 while viewing the liquid crystal display 3. At this time, alignment may be performed in a state where the liquid crystal display 3 is removed from the rod-shaped member 11 and placed at a position such that the liquid crystal display 3 is easier for the operator to see. Thus, when the alignment is complete (YES in step S204), the complete button on the operation screen is pressed (step S205). Accordingly, the second setting control unit 73 sets the position of the marker M resulting from the alignment as the monitoring reference position, and based on the monitoring reference position, the monitoring reference condition obtained by correcting the position of the bed 100 in the environment reference condition is set (step S206). Here, if the alignment or the installation position of the monitoring apparatus is to be changed once again (YES in step S207), the cancel button 34 on the operation screen is pressed (step S208). Accordingly, the installation position can be set once again. Also, if another setting is not needed (NO in step S207), monitoring using the image analysis unit 74 as described above is started (step S209).

As described above, according to the present embodiment, monitoring environment data that pre-defines the environment around the patient X to be imaged is stored according to the installation position of the camera 2, and this monitoring environment data makes it possible to perform image analysis according to the installation position of the camera 2. That is to say, the image captured by the camera 2 varies depending on the installation position of the camera 2, and therefore if this kind of monitoring environment data is referenced, the environment around the patient X is set as the monitoring environment condition for each installation position of the camera 2, and therefore the behavior of the patient X can be analyzed accurately using the environment as the reference. Furthermore, since the patient X and the marker M displayed on the liquid crystal display 3 are aligned and the aligned position of the marker M is stored as the monitoring reference position, the position of the bed 100 in the captured image can be accurately specified based on that. That is to say, the monitoring environment condition, which is the position of the bed 100 or the like that was set first, is corrected based on the monitoring reference position, and the monitoring reference condition is generated by which an accurate position of the bed 100 in the image is specified. Since the environment around the patient X, or in other words, a reference for behavior can be provided according to this, the image of the patient X captured by the camera 2 can be accurately analyzed.

2. Second Embodiment

The monitoring apparatus according to a second embodiment will be described next with reference to the drawings. Here, a description will be given mainly for the differences from the first embodiment. Accordingly, the same configurations are denoted by the same reference numerals, and the description thereof will not be repeated.

The present embodiment differs from the first embodiment in that a mechanism is used for aligning the marker and the patient X displayed on the liquid crystal display, and in contrast to the operator performing the alignment manually in the first embodiment, the alignment is performed by a machine in the monitoring apparatus according to the present embodiment. The configuration for that purpose will be described with a focus on the points of difference from the first embodiment.

Figure 11:
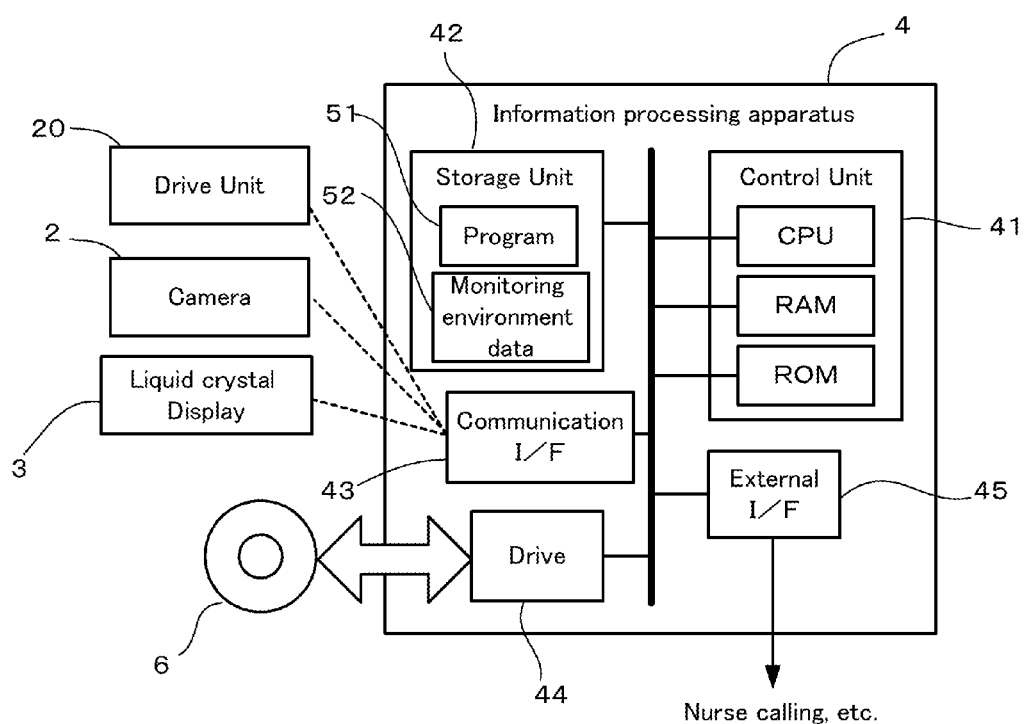
FIG. 11 is a block diagram of an information processing apparatus according to a second embodiment of the present invention.

First, the angle of the camera 2 can be adjusted with respect to the rod-shaped member 11 using a drive unit 20. The drive unit 20 is constituted by an angular adjustment mechanism (not shown) such as a gear or link mechanism for adjusting the angle of the camera 2, and by a motor (not shown) such as a servomotor that drives the mechanism. Also, the extension and retraction of the rod-shaped member 11 can be performed using a motor. As shown in FIG. 11, the drive unit 20 is connected wirelessly or by wire to the information processing apparatus.

Figure 12:
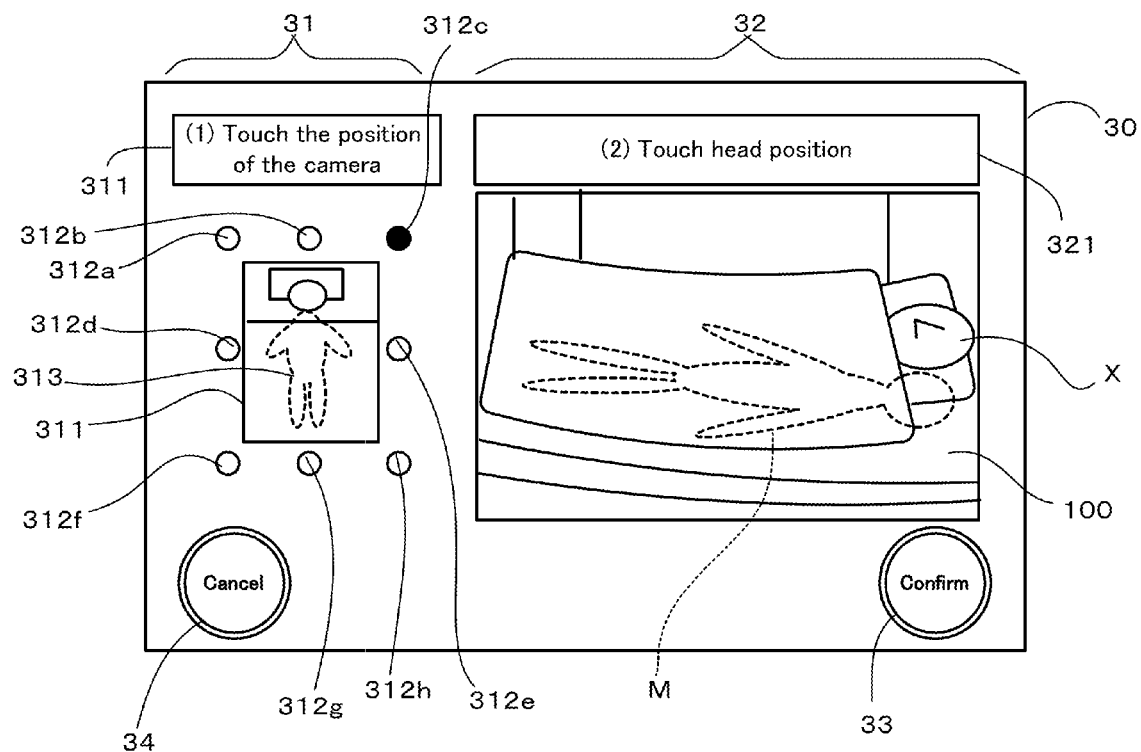
FIG. 12 is a diagram showing an example of an operation screen according to the second embodiment of the present invention.

Also, the function of the second setting control unit that was described as one of the functional configurations of the information processing apparatus 4 in the first embodiment is different from that of the first embodiment. This will be described below with reference to FIG. 12. In the first embodiment, the marker M is manually aligned with the patient X upon being displayed in the image display region 32, but in the present embodiment, the position of the patient X displayed in the image display region 32 is input. That is to say that after the marker M is displayed, the head of the patient X displayed in the image display region 32 is touched as prompted by the message 321 in the upper portion of the image display region 32. According to this, the second setting control unit 73 calculates an adjustment angle for the camera 2 (or in addition, an extension/retraction length for the rod-shaped member) by which the head portion of the marker M and the head of the patient X that was touched match, and drives the motor.

Figure 13:
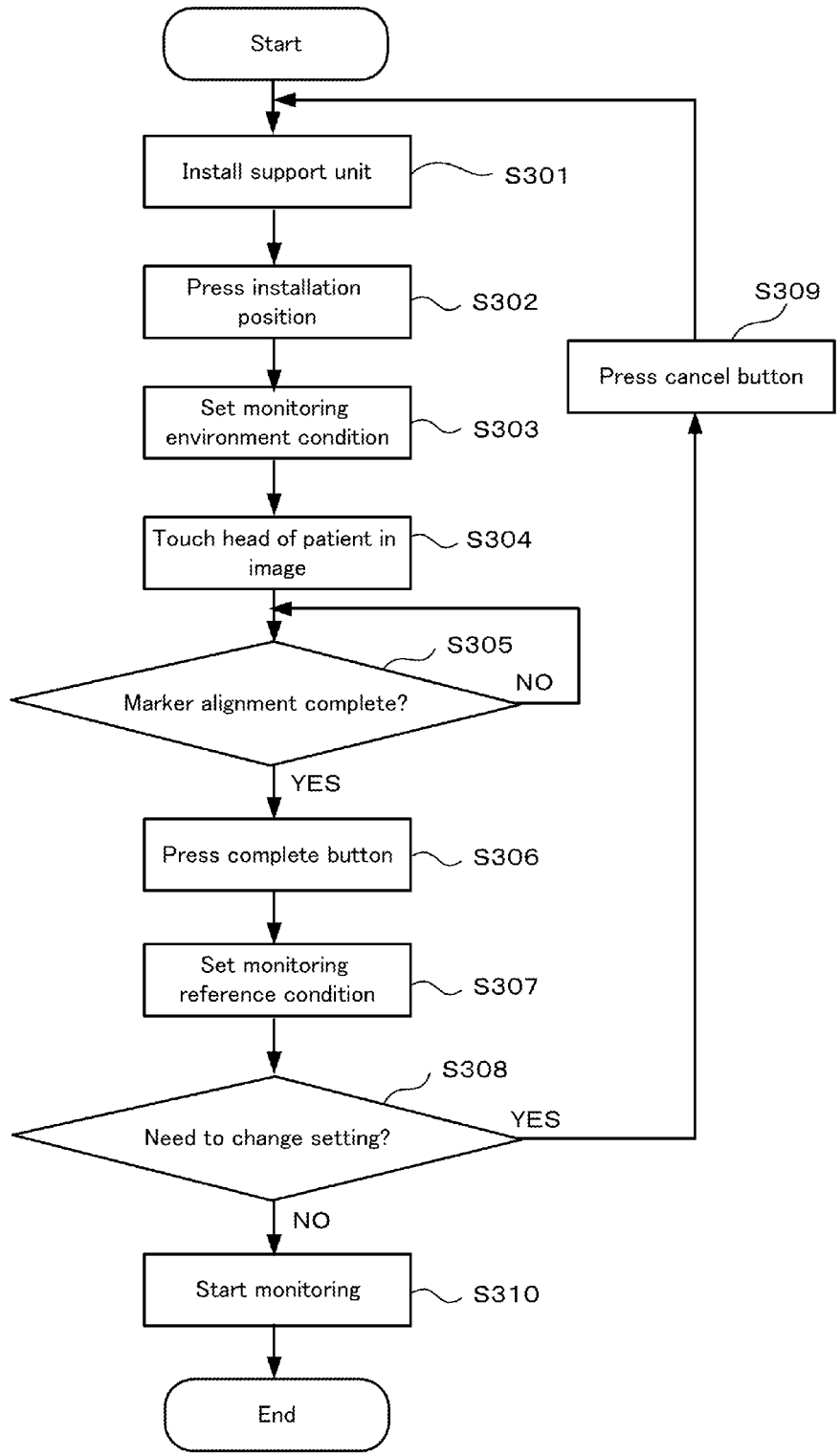
FIG. 13 is a flowchart showing a monitoring procedure of the monitoring apparatus according to the second embodiment.

A monitoring procedure performed by the monitoring apparatus including the above configuration will be described below with reference to the flowchart in FIG. 13. Here, a description will be given mainly for the differences from the first embodiment. After steps S301 to S303 have been performed, the marker M corresponding to the position of the camera 2 is displayed in the image display region 32. The operator touches the head of the patient X displayed in the image display region 32 so as to align the marker M and patient M displayed in the image display region 32 (step S304). Accordingly, the information processing apparatus 4 accepts the input of the position of the patient's head, and the second setting control unit 73 calculates the adjustment angle of the camera 2 based on the position and transmits a control signal to the drive unit 20. The drive unit 20 adjusts the angle of the camera 2 based on the control signal. Then, the operator checks the position of the marker M by viewing the liquid crystal display 3, and upon determining that the alignment is complete (YES in step S305), the operator presses the complete button on the operation screen (step S306). According to this, the second setting control unit 73 sets the aligned position of the marker M as the monitoring reference position and sets the monitoring reference condition using the monitoring reference position and the environment reference condition (step S307). The subsequent steps are the same as those in the first embodiment.

As described above, according to the present embodiment, the marker and the patient can be aligned automatically, and therefore the task is simpler and the burden on the operator can be reduced.

3. Variations

Embodiments of the present invention have been described above, but the present invention is not limited to the embodiments, and various modifications are possible within a scope that does not deviate from the gist of the invention.

3.1

Figure 14:
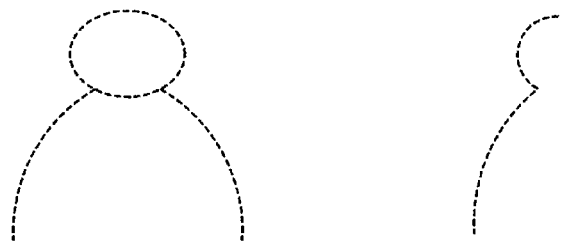
FIG. 14 is a diagram showing another example of a marker.

In the above embodiments, the marker M is indicated as the shape of the full body of the patient, but it is sufficient that at least a portion of the patient is indicated, and for example, a mode (a) seen from the front, or a mode (b) seen from the side can be used as a portion of a person's upper body as shown in FIG. 14.

3.2

Figure 15:
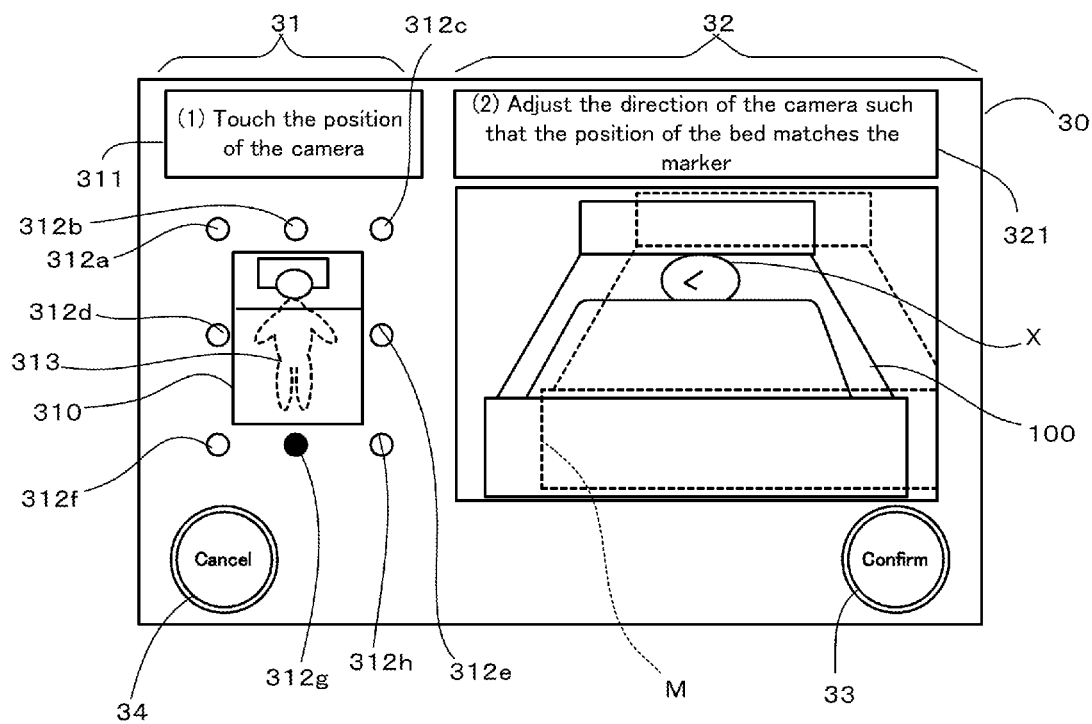
FIG. 15 is a diagram showing an example of an operation screen in the case where a bed is shown as a marker.

In the above embodiments, the patient and the marker M are aligned, but a configuration is possible in which alignment is performed not with the patient, but rather with the bed 100 that is the monitoring target reference object and the marker M. That is to say that it is possible to accurately specify the position of the bed 100 in the image rather than that of the patient and to analyze the behavior of the patient based thereon. For example, as shown in FIG. 15, at least a portion of the outline of the bed 100 may be displayed as the marker M, and alignment may be performed between the marker M and the bed 100 in the image. The position of the bed that is aligned at this time will be the monitoring reference position. By doing so, the position of the bed 100 can be accurately specified, and based on that position, a monitoring reference condition obtained by correcting the position of the bed in the monitoring environment condition is generated. Accordingly, the patient's behavior can be accurately analyzed. In this case, it is sufficient that the marker M indicates at least a portion of the bed.

3.3

The modes of the support unit 1, the camera 2, and the liquid crystal display 3 for example are not limited to those in the embodiments above, and various modes are possible. That is to say that there is no limitation on the support unit in particular, as long as a mode of support unit is used which can support the camera and the liquid crystal display. Also, the liquid crystal display includes a touch panel, but various modes of input units can be used, such as a dedicated button, keyboard, or mouse. Also, the first to third input units of the present invention are provided on a touch panel in the above embodiments, but the input units may be individually-provided input units as well.

3.4

The monitoring target reference object included in the above-described monitoring environment data may of course be a structure other than a bed, and there is no limitation to this as long as it is a structure in the periphery of the patient.

3.5

In the above embodiments, an example is given in which the monitoring apparatus according to the present embodiment is used as a watching apparatus for a patient, but in addition to being used to watch a patient in a hospital or the like, the monitoring apparatus can be used as an apparatus for monitoring a specific monitoring target as well.

The invention claimed is:

1. A monitoring apparatus for monitoring behavior of a monitoring target, the monitoring apparatus comprising:
a single imaging unit configured to be installed at one installation position selected from a plurality of different installation positions around a bed on which the monitoring target is lying;
a display unit that displays the monitoring target imaged by the imaging unit in real time and displays a marker for specifying the position of the monitoring target lying on the bed, the display unit configured to display a plurality of installation position candidates indicating candidates for the installation position;
a first input unit that receives selection of one installation position from the plurality of the installation position candidates displayed in the display unit,
a first storage unit storing monitoring environment data that defines, in advance, an environment around the monitoring target that is to be imaged by the imaging unit, in accordance with each installation position;
a first setting control unit that reads out the monitoring environment data from the first storage unit based on the installation position input to the first input unit and sets a monitoring environment condition;
a second input unit that receives input of completion of alignment after the monitoring target lying in the bed and the marker displayed on the display unit are aligned by changing at least one of the position and the orientation of the imaging unit installed at the selected installation position;
a second storage unit that, after the alignment is complete, stores the position of the marker as the monitoring reference position of the monitoring target;
a second setting control unit that, based on the monitoring environment condition and the monitoring reference position that was input to the second input unit, sets a monitoring reference condition that is to be the reference for analyzing behavior of the monitoring target based on an image of the monitoring target captured by the imaging unit; and
an image analysis unit that, based on the monitoring reference condition, analyzes the image of the monitoring target captured by the imaging unit and detects behavior of the monitoring target.

2. The monitoring apparatus according to claim 1, further comprising:
a support unit that supports each of the imaging units,
wherein each of the imaging units is configured such that at least one of the orientation and the position with respect to the support unit is adjustable.

3. The monitoring apparatus according to claim 1, further comprising:
a third input unit that receives input of the position of the monitoring target displayed on the display unit; and
a drive unit that changes at least one of the position and the orientation of each of the imaging units with respect to the support unit,
wherein the second setting control unit performs control of the drive unit such that the marker is aligned to the position of the monitoring target on the display unit received by the third input unit.

4. The monitoring apparatus according to claim 1
wherein the display unit performs a display that prompts input of one of the plurality of installation position candidates from the first input unit.

5. The monitoring apparatus according to claim 1,
wherein the marker has the shape of a person, and
the first setting control unit displays the marker in a mode corresponding to the installation position on the display unit.

6. The monitoring apparatus according to claim 1,
wherein the monitoring environment data includes at least the mode of the bed that the monitoring target is lying on and is included in the image captured by each of the imaging units, and a region in which the monitoring target is estimated to move based on the bed as a reference.

7. The monitoring apparatus according to claim 1, further comprising:
a notification unit that performs notification of the behavior of the monitoring target detected by the image analysis unit.

8. A monitoring method for monitoring behavior of a monitoring target using the monitoring apparatus according to claim 1, comprising the steps of:
installing the imaging unit at one of the plurality of installation positions;
selecting one installation position from a plurality of the installation position candidates displayed on the display unit;
aligning the monitoring target lying in the bed and the marker displayed on the display unit by changing at least one of the position and the orientation of the imaging unit installed at the selected installation position; and
notifying the behavior of the monitoring target when detecting the behavior.

9. A monitoring method according to claim 8;
wherein the aligning the monitoring target lying in the bed and the marker comprises the steps of:
inputting the position of the monitoring target; and
changing at least one of the position and the orientation of the imaging unit based on the input position of the monitoring target.

* * * * *